(12) United States Patent
Alderfer et al.

(10) Patent No.: US 7,795,343 B2
(45) Date of Patent: *Sep. 14, 2010

(54) POLYMER COMPOSITION

(75) Inventors: Keith Allen Alderfer, Lansdale, PA (US); Gary William Dombrowski, West Chester, PA (US); John Charles Halligan, Oreland, PA (US); Kenneth Lennon, Jr., Quakertown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 621 days.

This patent is subject to a terminal disclaimer.

(21) Appl. No.: 11/637,490

(22) Filed: Dec. 12, 2006

(65) Prior Publication Data

US 2008/0139737 A1  Jun. 12, 2008

Related U.S. Application Data

(60) Provisional application No. 60/750,161, filed on Dec. 13, 2005.

(51) Int. Cl.
*C08J 3/00* (2006.01)
*C08L 33/00* (2006.01)
*C08L 33/18* (2006.01)
*C08L 33/20* (2006.01)
*C09D 5/02* (2006.01)
*B05D 7/00* (2006.01)

(52) U.S. Cl. ............... 524/521; 524/515; 524/523; 524/522; 524/501; 524/502; 525/238; 523/206

(58) Field of Classification Search ............ 525/238; 524/515, 521, 523, 522, 501, 502; 523/206
See application file for complete search history.

(56) References Cited

U.S. PATENT DOCUMENTS

| | | | | |
|---|---|---|---|---|
| 4,375,532 | A * | 3/1983 | Baer | 525/310 |
| 5,631,323 | A * | 5/1997 | Guntherberg et al. | 525/71 |
| 5,731,377 | A | 3/1998 | Friel | |
| 5,922,334 | A * | 7/1999 | Krasnansky et al. | 424/401 |
| 5,990,224 | A | 11/1999 | Raynolds et al. | |
| 6,924,336 | B2 * | 8/2005 | Faust et al. | 524/507 |
| 7,101,921 | B2 * | 9/2006 | Edwards et al. | 523/201 |
| 2003/0088014 | A1 * | 5/2003 | Edwards et al. | 524/523 |
| 2003/0114587 | A1 * | 6/2003 | Suzuki | 524/833 |
| 2004/0134791 | A1 | 7/2004 | Nakae et al. | |
| 2004/0221395 | A1 * | 11/2004 | Biver et al. | 8/94.15 |
| 2005/0032933 | A1 | 2/2005 | Hermes et al. | |

FOREIGN PATENT DOCUMENTS

| | | |
|---|---|---|
| AU | 678297 | 5/1997 |
| EP | 787769 | 8/1997 |

* cited by examiner

*Primary Examiner*—Vasu Jagannathan
*Assistant Examiner*—Irina Krylova
(74) *Attorney, Agent, or Firm*—Andrew Bunn

(57) ABSTRACT

A polymer composition including polymer particles comprising a first polymer and a second polymer is disclosed. The first polymer optionally has a crosslinked core and has a glass transition temperature in the range of −30° C. to 100° C. The second polymer comprising select crosslinking groups has a glass transition temperature in the range of −10° C. to less than 18° C. A coating composition comprising the polymer composition is provided. The polymer composition has good low temperature film formation and provides a film with an acceptable level of hardness.

12 Claims, No Drawings

POLYMER COMPOSITION

CROSS REFERENCE TO RELATED PATENT APPLICATIONS

This invention claims priority to U.S. Provisional Application No. 60/750,161 filed Dec. 13, 2005.

This invention relates to a polymer composition comprising polymer particles dispersed in an aqueous medium. The polymer particles comprise a first polymer and a second polymer. The polymer composition is film forming at low temperature and provides a coating having a hard film. The invention also relates to coating compositions comprising these polymer compositions.

Coating hardness is related primarily to its modulus, and harder coatings are desired in many applications to provide a protective film to a substrate. Coatings with good hardness may be prepared from aqueous polymer particle dispersions containing hard polymers, i.e. polymers with glass transition temperatures significantly above ambient temperatures. However, coating compositions containing these hard polymers typically include additives such as volatile coalescents to allow the hard polymers to flow and form a film at ambient temperature. After film formation, such volatile coalescents evaporate, leaving a dry, hard polymer film. In the absence of such additives, however, a good level of hardness and polymer flow (and thus acceptable film forming) are mutually exclusive properties. The use of volatile coalescents including volatile solvents, is coming under increased scrutiny as they may be a source of volatile organic compounds (VOC's) which can contribute to atmospheric pollution. Accordingly, aqueous polymer compositions are needed that provide a hard coating and may be formulated either with reduced levels of or no volatile coalescents.

U.S. Patent Application Publication No. 2003/0088014 discloses a polymer composition including polymer particles containing a first polymer and a second polymer. The first polymer has a crosslinked core and a glass transition temperature in the range of $-30°$ C. to $100°$ C. It contains as polymerized units, based on the weight of the first polymer, from: 85 to 99.9 weight % comonomer, 0 to 5 weight % anionic monomer, and 0.1 to 10 weight % multiethylenically unsaturated monomer. The second polymer contains select crosslinking groups and has a glass transition temperature in the range of $-10°$ C. to less than $18°$ C. It contains as polymerized units, based on the weight of the second polymer, from: 70 to 99 weight % comonomer, 0 to 10 weight % anionic monomer, and 1 to 20 weight % crosslinking monomer. The disclosed polymer composition has good low temperature film formation resulting in a film with an acceptable level of hardness, and can be used to prepare coatings. However, despite this disclosure, there is an ongoing need for polymer compositions that provide a combination of good low temperature film formation and form hard films.

Despite the generally contrary nature of hardness and flow of polymer films, we have found a polymer composition that has improved low temperature film formation properties as well as improved hardness of the film as measured by such tests as dirt pick up resistance. The polymer composition comprises select polymer particles including a first polymer, which optionally may be crosslinked, and a second polymer having certain crosslinking groups.

One aspect of this invention is a polymer composition (1) comprising polymer particles dispersed in an aqueous medium, wherein the polymer particles comprise, based on the weight of the polymer particles: from 20 to 70 weight % of a first polymer; and from 30 to 80 weight % of a second polymer. The first polymer has a glass transition temperature in the range of $-30°$ C. to $100°$ C. and comprises as polymerized units, based on the weight of the first polymer, from: 15 to 50 weight % of one or more of the following monomers: acrylonitrile, methacrylonitrile, vinylbenzonitrile and its isomers, cyanoacrylates, vinyl chloride, vinylidene chloride, alpha-cyano styrene and other multiply cyanated styrenics, or combinations thereof, and from 50 to 85 weight % of one or more ethylenically unsaturated comonomers. The second polymer has a glass transition temperature in the range of $-10°$ C. to less than $18°$ C. and comprises as polymerized units, based on the weight of the second polymer, from: 70 to 98.5 weight % of one or more ethylenically unsaturated comonomers, 0.5 to 10 weight % of one or more acid functional or anionic monomers, and 1 to 20 weight % of one or more monomers capable of crosslinking. These monomers capable of crosslinking include those selected from the group consisting of acetoacetoxyethyl(meth)acrylate, acetoacetoxypropyl(meth)acrylate, acetoacetoxybutyl(meth)acrylate, 2,3-di(acetoacetoxy)propyl(meth)acrylate, allyl acetoacetate, and vinyl acetoacetate; acetoacetamidoethyl(meth)acrylate, acetoacetamidopropyl(meth)acrylate, acetoacetamidobutyl(meth)acrylate, 2,3-di(acetoacetamido)propyl(meth)acrylate, allyl acetoacetamide, and vinyl acetoacetamide; cyanoacetoxyethyl(meth)acrylate, cyanoacetoxypropyl(meth)acrylate, cyanoacetoxybutyl(meth)acrylate, 2,3-di(cyanoacetoxy)propyl(meth)acrylate, allyl cyanoacetate, and vinyl cyanoacetate; cyanoacetamidoethyl(meth)acrylate, cyanoacetamidopropyl(meth)acrylate, cyanoacetamidobutyl(meth)acrylate, 2,3-di(cyanoacetamido)propyl(meth)acrylate, allyl cyanoacetamide, and vinyl cyanoacetamide.

One embodiment of this invention is the polymer composition described above (polymer composition 1), wherein the first polymer further comprises 0.1 to 10 weight %, based on the weight of the first polymer, of one or more multiethylenically unsaturated monomers. This composition is herein referred to as polymer composition 2.

Another embodiment, polymer composition 3, is the polymer composition 1 described above wherein (a) the first polymer further comprises 0.5 to 5 weight % of one or more acid functional or anionic monomers, or polymerizable surfactants, or stabilizing functional reagents; or (b) the polymer composition comprises a stabilizing reagent.

Another embodiment, polymer composition 4, similarly refers to the polymer composition 2 described above wherein (a) the first polymer further comprises 0.5 to 5 weight % of one or more acid functional or anionic monomers, or polymerizable surfactants, or stabilizing functional reagents; or (b) the polymer composition comprises a stabilizing reagent.

Another embodiment of this invention (referred to as polymer composition 5) is the polymer composition 1 described above wherein (a) the second polymer further comprises 0.5 to 10 weight %, based on the weight of the second polymer, of one or more acid functional or anionic monomers, or polymerizable surfactants, or stabilizing functional reagents; or (b) the polymer composition comprises a stabilizing reagent.

Another embodiment, polymer composition 6, similarly refers to the polymer composition 2 described above wherein (a) the second polymer further comprises 0.5 to 10 weight %, based on the weight of the second polymer; of one or more acid functional or anionic monomers, or polymerizable surfactants, or stabilizing functional reagents; or (b) the polymer composition comprises a stabilizing reagent.

A particularly preferred embodiment of polymer composition 1 exists for the case where the second polymer has a Tg in the range of $-10°$ C. to $15°$ C. Another particularly preferred embodiment of polymer composition 1 exists for the case where its minimum film formation temperature is no greater than 30° C.

Another aspect of this invention is a coating composition prepared from the polymer composition 1 described above, wherein the coating composition comprises one or more pigments wherein the coating composition has a pigment volume concentration from 1 to 45%.

A particularly preferred embodiment of this aspect of the invention is when the coating composition comprises less than 6 weight % volatile organic compounds, based on the weight of the dry polymer composition; and another particularly preferred embodiment is when the second polymer of the polymer composition included in the coating composition has a Tg in the range of −10° C. to 15° C.; and when the coating composition has a minimum film formation temperature that is no greater than 30° C.

As used herein, the term "(meth)acrylate" refers to either acrylate or methacrylate and the term "(meth)acrylic" refers to either acrylic or methacrylic.

As used herein, the term "AN group monomers" refers to the following group of monomers: acrylonitrile, methacrylonitrile, vinylbenzonitrile and its isomers, cyanoacrylates, vinyl chloride, vinylidene chloride, alpha-cyano styrene and other multiply cyanated styrenics.

The term "stabilizing reagent" as used herein refers to any species that can stabilize or aid in stabilizing an oligomer, polymer, or polymeric particle in water during or after the emulsion polymerization. Such species include anionic or nonionic dispersing agents, also referred to as surfactants; high molecular weight polymers such as hydroxy ethyl cellulose, methyl cellulose, and polyvinyl alcohol; protective colloids; polyelectrolytes such as polyacrylic acid; acidic monomers particularly those of low molecular weight, such as acrylic acid and methacrylic acid.

Polymerizable surfactants and other monomers that can be copolymerized with the polymer, such as the polyalkylene oxide-derivatized (meth)acrylate type monomers described herein below, are referred to as "polymerizable stabilizing reagents."

A volatile organic compound (VOC) is defined herein as a carbon-containing compound that has a boiling point below 280° C. at atmospheric pressure.

The pigment volume concentration of a species of pigment particles is the percentage of the volume occupied by that species of pigment particles, based on the total volume of the dried coating prepared from the coating composition.

"Glass transition temperature" or "$T_g$" as used herein, means the temperature at or above which a glassy polymer will undergo segmental motion of the polymer chain. Specifically, glass transition temperature, as defined herein, of a polymer is calculated with the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, based on weight of monomers charged to the reaction vessel, and $T_{g(1)}$ and $T_{g(2)}$ refer to the glass transition temperatures of the two corresponding homopolymers in Kelvin. For polymers containing three or more monomers, additional terms are added ($w_n/T_{g(n)}$). The glass transition temperatures of homopolymers for the purposes of this invention are those reported in "Polymer Handbook", edited by J. Brandrup and E. H. Immergut, Interscience Publishers, unless that publication does not report the Tg of a particular homopolymer, in which case the Tg of the homopolymer is measured by differential scanning colorimetry (DSC). To measure the glass transition temperature of a homopolymer by DSC, the homopolymer sample is prepared and maintained in the absence of ammonia or primary amine. The homopolymer sample is dried, preheated to 120° C., rapidly cooled to −100° C., and then heated to 150° C., at a rate of 20° C./minute while data is collected. The glass transition temperature for the homopolymer is measured at the midpoint of the inflection using the half-height method.

The Fox calculation of the $T_g$ for a copolymer containing crosslinking monomers as polymerized units, is based on glass transition temperatures for the homopolymers formed from each crosslinking monomer wherein the homopolymer is not in the presence of ammonia or a primary amine. The glass transition temperature values for homopolymers formed from the anionic monomers are for anionic homopolymers in the acid form.

The minimum film forming temperature (MFFT) of a polymer coating is the minimum temperature at which the polymer coating forms a continuous film, as evidenced by the visual lack of cracking and/or powdery appearance of the film and the film integrity. It is determined by testing the film on a temperature gradient plate (MFFT apparatus), as described by Sperry et al. (Langmuir, 1994, (10), 2619-2628).

The polymer composition of this invention includes polymer particles having a select composition including a first polymer and a second polymer, both of which are formed by the polymerization of ethylenically unsaturated monomers. The first polymer has a composition that optionally includes at least one multiethylenically unsaturated monomer as a polymerized unit. The second polymer comprises crosslinking groups capable of forming crosslinks after formation of a film comprising the polymer particles. The polymer composition is useful for forming hard films with minimal levels of coalescent or without coalescent.

The first polymer comprises 15 to 50 weight % (based on the weight of the first polymer) as polymerized units, monomers selected from the AN group of monomers defined above. It additionally comprises comonomers, and optionally, multiethylenically unsaturated monomers, and/or anionic monomers. The second polymer comprises as polymerized units, comonomers, crosslinking monomers, and anionic monomers.

Multiethylenically unsaturated monomers are monomers containing at least two ethylenically unsaturated groups. Suitable multiethylenically unsaturated monomers include ethylene glycol diacrylate, ethylene glycol dimethacrylate, triethylene glycol dimethacrylate, tetraethylene glycol dimethacrylate, 1,3-butylene, glycol dimethacrylate, trimethylolpropane triacrylate, trimethylol propane trimethacrylate, 1,4-butanediol diacrylate, 1,4-butanediol dimethacrylate, neopentyl glycol diacrylate, neopentyl glycol dimethacrylate, 1,6-hexanediol diacrylate, 1,6-hexanediol dimethacrylate, pentaerythritol diacrylate, pentaerythritol dimethacrylate, glycerin diacrylate, glycerin dimethacrylate, allyl acrylate, allyl methacrylate, diallyl phthalate, divinyl benzene, or mixtures thereof.

Anionic monomers are ethylenically unsaturated monomers containing acid groups or salts thereof. Suitable acid groups include carboxylic acid groups, phosphorus acid groups, and sulfur acid groups. Anionic monomers include carboxylic acid monomers such as (meth)acrylic acid, fumaric acid, itaconic acid, maleic acid, maleic anhydride, and monoesters of fumaric acid; phosphorus acid monomers such as phosphoethyl(meth)acrylate and allyl phosphonic acid; and sulfur acid monomers such as 2-acrylamido-2-methyl-1-propanesulfonic acid, sulfoethyl(meth)acrylate, and vinyl sulfonic acid. The first polymer or the second polymer may comprise one or more anionic monomers.

Crosslinking monomers contain at least one ethylenic unsaturation and at least one crosslinking group selected from acetoacetoxy-, acetoacetamido-, cyanoacetoxy-, and cyanoacetamido-groups. Crosslinking monomers containing acetoacetoxy groups include acetoacetoxy functional monomers having the structure:

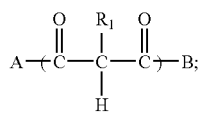

B is either A, alkyl having 1 to 10 carbon atoms or phenyl, substituted phenyl, or heterocyclic.

Suitable acetoacetoxy functional monomers include acetoacetoxyethyl(meth)acrylate, acetoacetoxypropyl(meth)acrylate, allyl acetoacetate, acetacetoxybutyl(meth)acrylate, 2,3-di(acetoacetoxy)propyl(meth)acrylate, and vinyl acetoacetate. Similar acetoacetamido-functional monomers are also suitable, such as acetoacetamidoethyl(meth)acrylate, acetoacetamidopropyl(meth)acrylate, acetoacetamidobutyl(meth)acrylate, 2,3-di(acetoacetamido)propyl(meth)acrylate, allyl acetoacetamide, and vinyl acetoacetamide; likewise cyanoacetoxy-functional monomers are also suitable, such as cyanoacetoxyethyl(meth)acrylate, cyanoacetoxypropyl(meth)acrylate, cyanoacetoxybutyl(meth)acrylate, 2,3-di(cyanoacetoxy)propyl(meth)acrylate, allyl cyanoacetate, and vinyl cyanoacetate; as well as cyanoacetamido-functional monomers, such as cyanoacetamidoethyl(meth)acrylate, cyanoacetamidopropyl(meth)acrylate, cyanoacetamidobutyl(meth)acrylate, 2,3-di(cyanoacetamido)propyl(meth)acrylate, allyl cyanoacetamide, and vinyl cyanoacetamide.

The second polymer may be polymerized from a mixture containing one or more crosslinking monomers.

The first polymer and the second polymer also comprise comonomers as polymerized units. Comonomers as defined herein are ethylenically unsaturated monomers that are not anionic monomers, polymerizable stabilizing reagents, multiethylenically unsaturated monomers, or crosslinking monomers, and also exclude those monomers defined as AN group monomers. Suitable comonomers include, for example, (meth)acrylic esters including $C_1$ to $C_{40}$ esters of (meth)acrylic acid such as methyl(meth)acrylate, ethyl(meth)acrylate, butyl(meth)acrylate, 2-ethylhexyl(meth)acrylate, decyl(meth)acrylate, lauryl(meth)acrylate, stearyl(meth)acrylate, isobornyl(meth)acrylate; hydroxyalkyl esters of (meth)acrylic acid such as hydroxyethyl(meth)acrylate and hydroxypropyl(meth)acrylate; styrene or substituted styrenes; vinyl acetate or other vinyl esters; N-vinyl pyrrolidone; acrylamide, and methacrylamide.

The first polymer comprises as polymerized units, monomers selected from the AN group of monomers defined above, comonomers, and optionally, multiethylenically unsaturated monomers, and/or anionic monomers. The types and levels of AN group monomers, comonomers, anionic monomers, and multiethylenically unsaturated monomers are chosen to provide a first polymer having a Tg in the range of −30° C. to 100° C., preferably in the range of −20° C. to 50° C., and more preferably in the range of −15° C. to 30° C. The second polymer comprises as polymerized units, comonomers, crosslinking monomers, and anionic monomers. The levels of comonomers, optional anionic monomers, and crosslinking monomers are chosen to provide a second polymer having a $T_g$ in the range of −15° C. to less than 25° C., preferably −10° C. to less than 18° C., more preferably in the range of −10° C. to 15° C., even more preferably in the range of −5° C. to 15° C., and most preferably in the range of 0° C. to 10° C.

The first polymer comprises as polymerized units, from 15 to 50 weight % of at least one AN group monomer, preferably from 25 to 45 weight % AN group monomer, and more preferably from 30 to 40 weight % AN group monomer, based on the weight of the first polymer. The first polymer also comprises as polymerized units, from 50 to 85 weight % comonomer, preferably from 55 to 75 weight % comonomer, and more preferably from 60 to 70 weight % comonomer, based on the weight of the first polymer. The first polymer, optionally, may also comprise as polymerized units, from 0.1 to 10 weight % multiethylenically unsaturated monomer, preferably from 0.4 to 8 weight % multiethylenically unsaturated monomer, and more preferably, if used, from 0.4 to 5 weight % multiethylenically unsaturated monomer, based on the weight of the first polymer. The first polymer optionally comprises as polymerized units, from 0.5 to 5 weight %, and preferably from 0.5 to 1 weight %, of one or more acid functional or anionic monomers or polymerizable stabilizing reagents, based on the weight of the first polymer.

The second polymer comprises as polymerized units, from 70 to 98.5 weight % comonomer, preferably from 80 to 98 weight % comonomer, and more preferably from 85 to 96 weight % comonomer, based on the weight of the second polymer. The second polymer also comprises as polymerized units, from 0.5 to 10 weight %, preferably from 0.5 to 7 weight %, and more preferably from 1 to 5 weight %, of one or acid functional or anionic monomers or polymerizable stabilizing reagents, based on the weight of the second polymer. Further, the second polymer comprises as polymerized units, from 1 to 20 weight % crosslinking monomer mentioned above, preferably from 3 to 15 weight % crosslinking monomer, and more preferably from 5 to 10 weight % crosslinking monomer, based on the weight of the second polymer.

Specific combinations of the monomer components are chosen to undergo copolymerization to prepare the composition of the first polymer or the composition of the second polymer, and to provide polymer particles and coatings prepared from the polymer particles with desired application properties, as is known in the art.

The polymer particles may have morphologies in which the second polymer fully or partially encapsulates the first polymer, or vice versa. Suitable morphologies include core-shell polymers in which the first polymer forms the core and the second polymer forms the shell, a polymer particle in which the first polymer forms two or more domains within the second polymer, and an acorn morphology in which the second polymer partially covers the first polymer core and provides the majority of the surface area of the polymer particle. A preferred morphology is a core-shell polymer with a first polymer core and a second polymer shell. The invention can be practiced with the use of a seed polymer, which may or may not be pre-formed; indeed the first polymer of the invention may be a seed polymer. Electron microscopy in combination with heavy metal staining techniques may be used to determine polymer particle morphology.

The polymer particles may have average particle diameters in the range of 40 nm to 1000 nm, preferably in the range of 60 nm to 500 nm, and more preferably in the range of 80 nm to 200 nm. The average particle diameter may be measured by a quasi-elastic light scattering technique, using an instrument such as a Brookhaven Model BI-90 Particle Sizer, supplied by Brookhaven Instruments Corporation, Holtsville, N.Y.

The polymer composition comprises the polymer particles dispersed in an aqueous medium. The aqueous medium may contain cosolvents including water miscible cosolvents such as methanol, ethanol, propanol, ethylene glycol, propylene glycol, acetone ethylene glycol ethyl ethers, propylene glycol propyl ethers and diacetone alcohol; and water immiscible solvents such as propyl acetate, butyl acetate, methyl isoamyl ketone, amyl acetate, diisobutyl ketone, xylene, toluene, butanol, and mineral spirits. Preferably the polymer composition comprises from 0 to 20 weight % cosolvent, more preferably, from 0 to 10 weight % cosolvent, and more preferably, from 0 to 8 weight % cosolvent, based on the weight of the polymer composition. The polymer composition may be provided with 10 to 70 weight % polymer particles, based on the weight of the wet polymer composition.

The polymer composition containing the polymer particles may be prepared by suspension or emulsion polymerization techniques. The polymerization may be a two-stage or a multi-stage process. In a two-staged process, the first polymer may be prepared by aqueous emulsion polymerization of a first monomer mixture comprising at least one AN group monomer, at least one comonomer, and optionally, at least one multiethylenically unsaturated monomer, and/or at least one anionic monomer to form particles of the first polymer. Next, the second polymer is prepared by aqueous emulsion polymerization of a second monomer mixture comprising at least one comonomer, at least one anionic monomer, and at least one crosslinking monomer in the presence of the first polymer particles.

The practice of emulsion polymerization is discussed in detail in D.C. Blackley, *Emulsion Polymerization* (Wiley, 1975). Conventional emulsion polymerization techniques may be used to prepare the polymer composition of this invention as an aqueous dispersion of polymer particles. The practice of emulsion polymerization is also discussed in H. Warson, *The Applications of Synthetic Resin Emulsions*, Chapter 2 (Ernest Benn Ltd., London 1972).

Thus the ethylenically unsaturated monomers may be emulsified with a stabilizing reagent such as an anionic or nonionic dispersing agent, also referred to as a surfactant, using for example from 0.05 to 10% by weight of dispersing agent on the weight of total monomers. Combinations of anionic and nonionic dispersing agents may also be used. High molecular weight polymers such as hydroxy ethyl cellulose, methyl cellulose, and vinyl alcohol may be used as emulsion stabilizers and protective colloids, as may polyelectrolytes such as polyacrylic acid. Acidic monomers particularly those of low molecular weight, such as acrylic acid and methacrylic acid, are water soluble, and thus may serve as dispersing agents which aid in emulsifying the other monomers used.

Suitable anionic dispersing agents include, for example, the higher fatty alcohol sulfates, such as sodium lauryl sulfate; alkylaryl sulfonates such as sodium or potassium isopropylbenzene sulfonates or isopropyl naphthalene sulfonates; alkali metal higher alkyl sulfosuccinates, such as sodium octyl sulfosuccinate, sodium N-methyl-N-palmitoyl-laurate, sodium oleyl isothionate; alkali metal salts and ammonium salts of alkylarylpolyethoxyethanol sulfates, sulfonates, or phosphates, such as sodium tert-octylphenoxy-polyethoxyethyl sulfate having 1 to 50 oxyethylene units; alkali metal salts and ammonium salts of alkyl polyethoxyethanol sulfates, sulfonates, and phosphates; and alkali metal salts and ammonium salts of aryl polyethoxyethanol sulfates, sulfonates, and phosphates.

Suitable nonionic dispersing agents include alkylphenoxy-polyethoxyethanols having alkyl groups of from about 7 to 18 carbon atoms and from about 6 to about 60 oxyethylene units, such as heptylphenoxypolyethoxyethanols, methyloctyl phenoxypolyethoxyethanols; polyethoxyethanol derivatives of methylene-linked alkyl phenols; sulfur-containing agents such as those made by condensing from about 6 to 60 moles of ethylene oxide with nonyl mercaptan, dodecyl mercaptan, or with alkylthiophenols wherein the alkyl groups contain from 6 to 16 carbon atoms; ethylene oxide derivatives of long chained carboxylic acids, such as lauric acid, myristic acid, palmitic acid, oleic acid, or mixtures of acids such as those found in tall oil containing from 6 to 60 oxyethylene units per molecule; analogous ethylene oxide condensates of long chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; block copolymers of ethylene oxide section combined with one or more hydrophobic propylene oxide sections. Mixtures of alkyl benzenesulfonates and ethoxylated alkylphenols may be employed.

The first polymer or the second polymer may comprise as a polymerized unit a copolymerizable surfactant having at least one polymerizable ethylenically unsaturated bond.

Other monomers that can be copolymerized with the polymer, such as the polyalkylene oxide-derivatized (meth)acrylate type monomers described in US 2001/0031826 (paragraphs 0001-0002), can also be used. Such materials, and those that function similarly, are herein collectively referred to as "polymerizable stabilizing reagents."

Preferably the polymer composition comprising the polymer particles comprises a total level of surfactant of 10 weight % or less, more preferably 7.5 weight % or less, and most preferably 5 weight % or less, based on the weight of the polymer particles. Although higher levels of surfactant may be used, in many coating applications, the surfactant may adversely affect coating properties such as moisture resistance.

A polymerization initiator of the free radical type, such as ammonium or potassium persulfate, may be used alone or as the oxidizing component of a redox system, which also includes a reducing component such as potassium metabisulfite, sodium thiosulfate, or sodium formaldehyde sulfoxylate. The reducing component is frequently referred to as an accelerator. The initiator and accelerator, commonly referred to as catalyst, catalyst system, or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II) and ammonium persulfate/sodium bisulfite/sodium hydrosulfite/Fe(II). Other suitable initiators include azo compounds. The polymerization temperature may be from 10° C. to 90° C., or more, and may be optimized for the catalyst system employed, as is conventional. Emulsion polymerization may be seeded or unseeded. In one embodiment of the invention, one or more AN group monomers may be present in the seed particle.

Chain transfer agents such as mercaptans, polymercaptan, and polyhalogen compounds in the polymerization mixture may be used to moderate the molecular weight of the first polymer or the second polymer. Examples of chain transfer agents which may be used include long chain alkyl mercaptans such as t-dodecyl mercaptans, alcohols such as isopropanol, isobutanol, lauryl alcohol, or t-octyl alcohol, carbon tetrachloride, tetrachloroethylene, and trichlorobromoethane. Generally from 0.1 to 3 weight %, based on the weight of total monomer in the first polymer or the second polymer, may be used. Alternatively, suitable molecular weights may be obtained by increasing the initiator level, or by a combination of increased initiator level and a chain transfer agent.

The polymerization process to prepare the first polymer or the second polymer may be a thermal or redox type; that is, free radicals may be generated solely by the thermal dissociation of an initiator species or a redox system may be used. A monomer emulsion containing all or some portion of the monomers to be polymerized may be prepared using the monomers, water, and surfactants. A catalyst solution containing catalyst in water may be separately prepared. The monomer emulsion and catalyst solution may be cofed into the polymerization vessel over the course of the emulsion polymerization. The reaction vessel itself may initially contain water. The reaction vessel may also additionally contain seed emulsion and further may additionally contain an initial charge of the polymerization catalyst. The temperature of the reaction vessel during the emulsion polymerization may be controlled by cooling to remove heat generated by the polymerization reaction or by heating the reaction vessel. Several monomer emulsions may be simultaneously cofed into the reaction vessel. When multiple monomer emulsions are cofed, they may be of different monomer compositions. The sequence and rates at which the different monomer emulsions are cofed may be altered during the emulsion polymerization process. The pH of the contents of the reaction vessel may also be altered during the course of the emulsion polymerization process. Preferably the pH of the emulsion polymerization process to prepare the first polymer or the second polymer is less than 8, more preferably in the range of 2-6.

Other components may be added to the polymer composition of this invention, including without limitation, other polymers such as vinyl acetate polymers, styrene butadiene polymers, acrylic copolymers, and vinyl chloride copolymers; surfactants; plasticizers; buffers; neutralizers; humectants; waxes; dyes; pearlescents; adhesion promoters; tackifiers; dispersants; defoamers; leveling agents; optical brighteners; ultraviolet stabilizers such as hindered amine light stabilizers; coalescents; rheology modifiers or thickeners; preservatives; biocides; and antioxidants.

Additionally, the polymer composition may contain crosslinking agents that are reactive with the acetoacetoxy-, acetoacetamido-, cyanoacetoxy-, or cyanoacetamido-groups of the polymer particles. The type of crosslinking agent and the level of crosslinking agent are chosen such that the ability of the polymer composition to form a film is not materially affected. Suitable crosslinking agents include, for example, multifunctional amine compounds, oligomers, and polymers that have at least two amine groups such as hexamethylene diamine, ethylenediamine, 1,2-diaminopropane, 2-methyl-1,5-pentane diamine, 1,4-diaminobutane, 1,12-diaminododecane, 1,2-diaminocyclohexane, 1,2-phenyldiamine, diaminotoluene, polyethylene imine, difunctional and trifunctional Jeffamines™ curing agents (Huntsman Petrochemical Corporation), dihydrazides, and aqueous polyurethane dispersions with pendant amino, hydrazide or hydrazine groups; aminosilane epoxy silanes such as 3-aminopropyltrimethoxysilane, 3-aminopropyltriethoxysilane, 3-aminopropylmethyldimethoxysilane, 3-aminopropylmethyldiethoxysilane, 3-aminopropyltriisopropoxysilane, 3-aminopropylmethyldiisopropoxysilane, 3-aminopropylmethyldiisopropoxysilane, 3-aminopropyltriisopropoxysilane, N-2-aminoethyl-3-aminopropyltrimethoxysilane, N-2-aminoethyl-3-aminopropyltriethoxysilane, N-2-aminoethyl-3-aminopropylmethyldimethoxysilane, N-2-aminoethyl-3-aminopropylmethyldiethoxysilane, N-2-aminoethyl-3-aminopropyltriisopropoxysilane, N-2-aminoethyl-3-aminopropyltriisopropoxysilane, N-2-aminoethyl-3-aminopropylmethyldiisopropoxysilane, and N-2-aminoethyl-3-aminopropylmethyldiisopropoxysilane; epoxy silanes such as glycidoxypropyltrimethoxysilane, glycidoxypropylmethyldimethoxysilane, glycidoxypropyltriethoxysilane, glycidoxypropylmethyldiethoxysilane, or beta-(3,4-epoxycyclohexyl)ethyltriethoxysilane; multifunctional isocyanates such as Bayhydur™ XP-7063 isocyanate (Bayer); aliphatic carbodiimides such as Ucarlink™ XL-29SE crosslinker, or those disclosed in U.S. Pat. No. 4,977,219; aromatic carbodiimides such as disclosed in U.S. Pat. No. 5,574,083; divalent metal ions such as $Zn^{2+}$, $Mg^{2+}$, $Ca^{2+}$; and zirconates such as ammonium zirconium carbonate. Preferably, the multifunctional amine compounds employed as crosslinking agents in the polymer composition are primary amine groups. Preferred levels for the multifunctional amine compounds with primary amine groups in the polymer composition is a ratio of 0.1 to 1 primary amine groups per acetoacetoxy-, acetoacetamido-, cyanoacetoxy-, cyanoacetamido-groups, or combination thereof. Preferred aminosilanes include N-2-aminoethyl-3-aminopropylmethyldimethoxysilane, N-2-aminoethyl-3-aminopropyltrimethoxysilane, and 3-aminopropylmethyldimethoxysilane.

The polymer composition of this invention can be used to make coating compositions with the addition, among other things, of various kinds of pigments. A coating composition of this invention comprises pigment at pigment volume concentrations in the range of 1 to 85%, preferably in the range of 1 to 45%, and more preferably in the range of 1 to 25%. The pigment volume concentration of a species of pigment particles is the percentage of the volume occupied by that species of pigment particles, based on the total volume of the dried coating prepared from the coating composition. Suitable pigments include inorganic pigments, organic pigments, and fillers such as titanium dioxide, iron oxide, zinc oxide, magnesium silicate, calcium carbonate, organic and inorganic colored pigments, aluminosilicates, silica, and various clays. Suitable organic pigments also include plastic pigments such as solid bead pigments and microsphere pigments containing voids or vesicles, and inorganic pigments. Examples of solid bead pigments include polystyrene and polyvinyl chloride beads. Examples of microsphere pigments, which include polymer particles containing one or more voids and vesiculated polymer particles, are disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; and U.S. Pat. No. 5,510,422. Other suitable pigments include, for example, Expancel™ 551 DE20 acrylonitrile/vinyl chloride expanded particles (Expancel Inc., Duluth, Ga.); Sil-Cell™ 35/34 a sodium potassium aluminum silicate particles (Silbrico Corporation, Hodgkins, Ill.); Dualite™ 27 polyvinylidene chloride copolymer coated with $CaCO_3$ (Pierce and Stevens Corporation, Buffalo, N.Y.); Fillitte™ 150 ceramic spherical particles (Trelleborg Fillite Inc., Norcross, Ga.); Microbeads™ 4A soda lime particles (Cataphote Inc.); Sphericell™ hollow glass particles (Potter Industries Inc., Valley Forge, Pa.); Eccosphere™ hollow glass spheres (New Metals & Chemicals Ltd., Essex, England); Z-light™ Sphere W-1200 ceramic hollow spheres (3M, St. Paul, Minn.); Scotchlite™ K46 glass bubbles (3M, St. Paul, Minn.); Vistamer™ UH 1500 polyethylene particles; and Vistamer™ HD 1800 polyethylene particles (Fluoro-Seal Inc., Houston, Tex.).

A volatile organic compound (VOC) may be added to the polymer or coating composition to improve the film properties or to aid in the application properties of the composition. Examples of such compounds include solvents and coalescents such as glycol ethers, organic esters, aromatic compounds, ethylene and propylene glycol, and aliphatic hydrocarbons. A volatile organic compound (VOC) is defined herein as a carbon-containing compound that has a boiling point below 280° C. at atmospheric pressure. In one embodiment, the polymer or coating composition of this invention is a low VOC polymer or coating composition. As used herein, low VOC polymer or coating composition refers to a polymer or coating composition containing from 0.01 to less than 6% VOC, by weight, preferably from 0.01 to less than to 3% VOC, and more preferably from 0.01 to less than 2% VOC, based on the total weight of the dried polymer or coating composition.

The polymer or coating composition of this invention may be applied onto substrates using conventional coating application methods, such as, for example, brushing, rolling, dipping, and spraying methods. Substrates to which the polymer or coating composition of this invention may be applied include, for example, timber including but not limited to cedar, pine, teak, oak, maple, and walnut; processed timber including but not limited to medium density fiber board, chip board, laminates; mineral substrates including but not limited to masonry, concrete, stucco, fiber, mortar, cement, cement asbestos, plaster, plasterboard, glazed and unglazed ceramic; metal including but not limited to galvanized iron, galvanized steel, cold rolled steel, Zincalum™ metal, Zincalum™ II metal, aluminum, wrought iron, drop forged steel, and stainless steel; previously painted or primed surfaces (fresh, aged or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; synthetic substrates including but not limited to polyvinyl chloride, polyvinylidene chloride, polyethylene, and polypropylene; asphalt; cellulosic substrates such as paper, paperboard, wallpaper, and wallboard; glass; leather; and woven and non-woven material such as cloth, wool, synthetic and natural fiber, and textiles. The polymer or coating composition may be used, for example, as a wood coating, maintenance coating, interior or exterior wall coating, metal primer or coating, traffic paint, woven or nonwoven textile saturant or coating, leather coating, coil coating, architectural coating, mastic sealant, caulk, board coating, paper coating, ink, overcoat varnish, flooring coating, and adhesive. Coatings prepared from the polymer composition may be clear coatings, flat coatings, satin coatings, semi-gloss coatings, gloss coatings, primers, textured coatings, and the like.

After the polymer or coating composition has been applied to a substrate, the polymer or coating composition is dried or is allowed to dry to form a film. Heat may be applied to dry the polymer or coating composition. After the film formation step, the film which comprises the polymer particles is cured or allowed to cure to form a crosslinked film. The reaction of the select crosslinking groups contained in the polymer particles is believed to result in the formation of crosslinks. The curing step may begin during the drying of the polymer or coating composition provided that the extent of crosslinking does not interfere with film formation. Curing to obtain useful properties may take place at ambient temperatures such as, for example, from 0° C. to 35° C. However, it is sometimes desirable to accelerate the rate of property development by heating the applied polymer or coating composition to a temperature from 25° C. to 200° C.

EXAMPLES

| Abbreviations | | Tg |
|---|---|---|
| Acetoacetoxyethyl methacrylate | AAEM | 280.3 |
| Allyl methacrylate | ALMA | 378 |
| Acrylonitrile | AN | 369 |
| Butyl acrylate | BA | 219 |
| Methyl methacrylate | MMA | 378 |
| Methacrylic acid | MAA | 458 |
| Vinyl toluene | | 373 |
| Surfactant A | | Alkylpolyethoxyphosphate, ammonium salt (25%) |
| Surfactant B | | Alkylpolyethoxysulfate, ammonium salt (30%) |

Example 1

Monomer mixture 1 is prepared by mixing 76.4 g of deionized water, 16.5 g of Surfactant A, 145.8 g of BA, 83.8 g of MMA, 131.2 g of AN, 1.8 g of MAA and 1.8 g of ALMA. A second monomer emulsion is prepared from 402 g of deionized water, 113 g of Surfactant A, 802 g of BA, 504.5 g of MMA, 17.5 g of vinyltoluene, 91 g of AAEM, and 43.7 g of MAA. A flask is charged with 1140.7 g of deionized water and 9.1 g of Surfactant B, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 20 minutes at 85° C. A mixture of 1.7 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 95 minutes at 85° C. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Comparative for Example 1

Monomer mixture 1 is prepared by mixing 76.4 g of deionized water, 16.5 g of Surfactant A, 145.8 g of BA, 215.1 g of MMA, 1.8 g of ALMA, and 1.8 g of MAA. A second monomer emulsion is prepared from 402 g of deionized water, 113 g of Surfactant A, 802 g of BA, 504.5 g of MMA, 17.5 g of vinyltoluene, 91 g of AAEM, and 43.8 g of MAA. A flask is charged with 1141 g of deionized water and 9.1 g of Surfactant B, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 20 minutes. A mixture of 1.7 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 80 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 2

Monomer mixture 1 is prepared by mixing 150 g of deionized water, 32.6 g of Surfactant A, 328 g of BA, 134.7 g of MMA, 262.4 g of AN, and 3.6 g of ALMA. A second monomer emulsion is prepared from 320 g of deionized water, 94.8 g of Surfactant A, 593 g of BA, 377.3 g of MMA, 82 g of AAEM, and 32.8 g of MAA. A flask is charged with 1090 g of deionized water and 20 g of Surfactant B, and then brought to 80° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 45 minutes. A mixture of 3.6 g of sodium persulfate in 120 g of deionized water is simultaneously added to the reactor with monomer emulsions 1 and 2. At the completion of addition of monomer emulsion 1, the reaction is held at temperature for 40 minutes. Monomer emulsion 2 is then fed to the reactor over 65 minutes. The temperature is allowed to rise to 85° C. over stage 2. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Comparative for Example 2

Monomer mixture 1 is prepared by mixing 150 g of deionized water, 32.6 g of Surfactant A, 328 g of BA, 397.1 g of MMA, and 3.6 g of ALMA. A second monomer emulsion is prepared from 320 g of deionized water, 94.8 g of Surfactant A, 601.5 g of BA, 377.3 g of MMA, 82 g of AAEM, and 32.8 g of MAA. A flask is charged with 1090 g of deionized water and 20 g of Surfactant B, and then brought to 80° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 45 minutes. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 60 minutes, and the temperature allowed to rise to 85° C. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 3

Monomer mixture 1 is prepared by mixing 150 g of deionized water, 32.6 g of Surfactant A, 328 g of BA, 131.2 g of MMA, 262.4 g of AN, 3.6 g of MAA, and 3.6 g of ALMA. A second monomer emulsion is prepared from 320 g of deionized water, 94.8 g of Surfactant A, 579.7 g of BA, 399.2 g of MMA, 82 g of AAEM, and 32.8 g of MAA. A flask is charged with 1141 g of deionized water and 9.1 g of Surfactant A, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 45 minutes. A mixture of 1.6 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 90 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Comparative for Example 3

Monomer mixture 1 is prepared by mixing 631.1 g of deionized water, 137 g of Surfactant A, 1356 g of BA, 1631.1 g of MMA, 15.1 g of MAA and 15.1 g of ALMA. A second monomer emulsion is prepared from 1346.3 g of deionized water, 398.7 g of Surfactant A, 2431.1 g of BA, 1649.7 g of MMA, 339 g of AAEM, and 135.6 g of MAA. A flask is charged with 4459.7 g of deionized water and 37.7 g of Surfactant A, and then brought to 85° C. under a nitrogen purge. The flask is then charged with a solution of 15.1 g of sodium persulfate in 84.1 g of deionized water and 436.5 g of monomer mixture 1. After 10 minutes, the remainder of monomer emulsion 1 is fed to the reactor over 40 minutes. A mixture of 6.9 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 60 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 4

Monomer mixture 1 is prepared by mixing 76.4 g of deionized water, 16.5 g of Surfactant A, 164.1 g of BA, 65.6 g of MMA, 131.2 g of AN, 1.8 g of ALMA, and 1.8 g of MAA. A second monomer emulsion is prepared from 402 g of deionized water, 113 g of Surfactant A, 802 g of BA, 504.5 g of MMA, 91 g of AAEM, 17.5 g of vinyltoluene, and 43.8 g of MAA. A flask is charged with 1141 g of deionized water and 9.1 g of Surfactant B, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 15 minutes. A mixture of 1.8 g of sodium persulfate in 95.2 g of deionized water is simultaneously added to the reactor with monomer emulsions 1 and 2. At the completion of addition of monomer emulsion 1, the reaction is held at temperature for 15 minutes. Monomer emulsion 2 was then fed to the reactor over 80 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Comparative for Example 4

Monomer mixture 1 is prepared by mixing 84.1 g of deionized water, 18.2 g of Surfactant A, 180.7 g of BA, 216.8 g of MMA, 2 g of ALMA, and 2 g of MAA. A second monomer emulsion is prepared from 442.6 g of deionized water, 124.4 g of Surfactant A, 882.2 g of BA, 554.8 g of MMA, 19.3 g of vinyltoluene, 100.4 g of AAEM, and 48.2 g of MAA. A flask is charged with 1418 g of deionized water and 10 g of Surfactant B, and then brought to 85° C. under a nitrogen purge. The flask is then charged with a solution of 4 g of sodium persulfate in 22.4 g of deionized water and 113 g of monomer mixture 1. After 10 minutes, the remainder of monomer emulsion 1 is fed to the reactor over 45 minutes. A mixture of 1.8 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 95 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 5

Monomer mixture 1 is prepared by mixing 110 g of deionized water, 26 g of Surfactant A, 246.1 g of BA, 79.3 g of MMA, 218.7 g of AN, and 2.7 g of ALMA. A second monomer emulsion is prepared from 380 g of deionized water, 103 g of Surfactant A, 701.7 g of BA, 454.2 g of MMA, 82 g of AAEM, and 38.3 g of MAA. A flask is charged with 1090 g of deionized water and 20 g of Surfactant B, and then brought to 80° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 40 minutes at 80° C. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 75 minutes. The temperature is allowed to rise to 85° C. over stage 2. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Comparative for Example 5

Monomer mixture 1 is prepared by mixing 110 g of deionized water, 26 g of Surfactant A, 246.1 g of BA, 295.3 g of MMA, 2.7 g of ALMA, and 2.7 g of MAA. A second monomer emulsion is prepared from 380 g of deionized water, 103 g of Surfactant A, 701.7 g of BA, 429.9 g of MMA, 15.3 g of vinyltoluene, 91 g of AAEM, and 38.3 g of MAA. A flask is charged with 1141 g of deionized water and 9.1 g of Surfactant B, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 35 minutes. A mixture of 1.6 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 70 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 6

Monomer mixture 1 is prepared by mixing 76.4 g of deionized water, 16.5 g of Surfactant A, 164.1 g of BA, 131.2 g of AN, 65.6 g of MMA, 1.8 g of MAA and 1.8 g of ALMA. A second monomer emulsion is prepared from 402 g of deionized water, 113 g of Surfactant A, 772.8 g of BA, 551.4 g of MMA, 91 g of AAEM, and 43.8 g of MAA. A flask is charged with 1141 g of deionized water and 9.1 g of Surfactant B, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 15 minutes. A mixture of 1.8 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 105 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Comparative for Example 6

Monomer mixture 1 is prepared by mixing 76.4 g of deionized water, 16.5 g of Surfactant A, 164.1 g of BA, 196.8 g of MMA, 1.8 g of ALMA, and 1.8 g of MAA. A second monomer emulsion is prepared from 402 g of deionized water, 113 g of Surfactant A, 772.8 g of BA, 533.7 g of MMA, 91 g of AAEM, 17.5 g of vinyltoluene, and 43.8 g of MAA. A flask is charged with 1141 g of deionized water and 9.1 g of Surfactant B, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 20 minutes. A mixture of 1.8 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 90 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 7

Monomer mixture 1 is prepared by mixing 150 g of deionized water, 32.6 g of Surfactant A, 328 g of BA, 262.4 g of AN, 134.8 g of MMA, and 3.6 g of ALMA. A second monomer emulsion is prepared from 320 g of deionized water, 94.8 g of Surfactant A, 553.4 g of BA, 336.4 g of MMA, 162.7 g of AAEM, and 32.8 g of MAA. A flask is charged with 1141 g of deionized water and 9.1 g of Surfactant B, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 45 minutes. A mixture of 1.7 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 90 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Comparative for Example 7

Monomer mixture 1 is prepared by mixing 150 g of deionized water, 32.6 g of Surfactant A, 322.3 g of BA, 387.7 g of MMA, 3.6 g of ALMA, and 3.6 g of MAA. A second monomer emulsion is prepared from 320 g of deionized water, 94.8 g of Surfactant A, 556.2 g of BA, 315.8 g of MMA, 17.2 g of vinyltoluene, 161.2 g of AAEM, and 32.2 g of MAA. A flask is charged with 1103 g of deionized water and 9 g of Surfactant B, and then brought to 85° C. under a nitrogen purge. The flask is then charged with a solution of 3.6 g of sodium persulfate in 20 g of deionized water and 103.7 g of monomer mixture 1. After 10 minutes, the remainder of monomer emulsion 1 is fed to the reactor over 40 minutes. A mixture of 1.6 g of sodium persulfate in 85 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 60 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 8

Monomer mixture 1 is prepared by mixing 150 g of deionized water, 32.6 g of Surfactant A, 328 g of BA, 251.4 g of MMA, 145.7 g of AN, and 3.6 g of ALMA. A second monomer emulsion is prepared from 320 g of deionized water, 94.5 g of Surfactant A, 557.8 g of BA, 421.1 g of MMA, 82 g of AAEM, and 32.8 g of MAA. A flask is charged with 1141 g of deionized water and 9.1 g of Surfactant A, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 45 minutes. A mixture of 1.6 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 90 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 9

Monomer mixture 1 is prepared by mixing 150 g of deionized water, 32.6 g of Surfactant A, 364.4 g of BA, 156.7 g of MMA, 204.1 g of AN, and 3.6 g of ALMA. A second monomer emulsion is prepared from 320 g of deionized water, 94.5 g of Surfactant A, 557.8 g of BA, 421.1 g of MMA, 82 g of AAEM, and 32.8 g of MAA. A flask is charged with 1141 g of deionized water and 9.1 g of Surfactant A, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 45 minutes. A mixture of 1.6 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 90 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 10

Monomer mixture 1 is prepared by mixing 150 g of deionized water, 32.6 g of Surfactant A, 328 g of BA, 193.1.4 g of MMA, 204.1 g of AN, and 3.6 g of ALMA. A second monomer emulsion is prepared from 320 g of deionized water, 94.5 g of Surfactant A, 557.8 g of BA, 421.1 g of MMA, 82 g of AAEM, and 32.8 g of MAA. A flask is charged with 1141 g of deionized water and 9.1 g of Surfactant A, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 45 minutes. A mixture of 1.6 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 90 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 11

Monomer mixture 1 is prepared by mixing 150 g of deionized water, 32.6 g of Surfactant A, 400.8 g of BA, 61.9 g of MMA, 262.4 g of AN, and 3.6 g of ALMA. A second monomer emulsion is prepared from 320 g of deionized water, 94.8 g of Surfactant A, 601.5 g of BA, 377.3 g of MMA, 82 g of AAEM, and 32.8 g of MAA. A flask is charged with 1090 g of deionized water and 20 g of Surfactant B, and then brought to 80° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 45 minutes, allowing the temperature to rise to 85° C. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 65 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 12

Monomer mixture 1 is prepared by mixing 150 g of deionized water, 32.6 g of Surfactant A, 400.8 g of BA, 61.9 g of MMA, 262.4 g of AN, and 3.6 g of ALMA. A second monomer emulsion is prepared from 320 g of deionized water, 94.8 g of Surfactant A, 623.3 g of BA, 355.4 g of MMA, 82 g of AAEM, and 32.8 g of MAA. A flask is charged with 1090 g of deionized water and 20 g of Surfactant B, and then brought to 80° C., under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 45 minutes, allowing the temperature to rise to 85° C. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 65 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 13

Monomer mixture 1 is prepared by mixing 150 g of deionized water, 32.6 g of Surfactant A, 400.8 g of BA, 61.9 g of MMA, 262.4 g of AN, and 3.6 g of ALMA. A second monomer emulsion is prepared from 320 g of deionized water, 94.8 g of Surfactant A, 601.5 g of BA, 298.3 g of MMA, 164 g of AAEM, and 32.8 g of MAA. A flask is charged with 1090 g of deionized water and 20 g of Surfactant B, and then brought to 80° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 45 minutes, allowing the temperature to rise to 85° C. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 65 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 14

Monomer mixture 1 is prepared by mixing 150 g of deionized water, 32.6 g of Surfactant A, 328 g of BA, 134.7 g of MMA, 262.4 g of AN, and 3.6 g of ALMA. A second monomer emulsion is prepared from 320 g of deionized water, 94.8 g of Surfactant A, 623.3 g of BA, 355.4 g of MMA, 82 g of AAEM, and 32.8 g of MAA. A flask is charged with 1090 g of deionized water and 20 g of Surfactant B, and then brought to 80° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 40 minutes, at 80° C. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 65 minutes. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 15

Monomer mixture 1 is prepared by mixing 150 g of deionized water, 32.6 g of Surfactant A, 328 g of BA, 131.2 g of MMA, 262.4 g of AN, and 13.3 g of (55%) divinylbenzene. A second monomer emulsion is prepared from 320 g of deionized water, 94.8 g of Surfactant A, 601.5 g of BA, 377.3 g of MMA, 82 g of AAEM, and 32.8 g of MAA. A flask is charged with 1090 g of deionized water and 20 g of Surfactant B, and then brought to 80° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 40 minutes. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 60 minutes. The temperature is allowed to rise to 85° C. over stage 2. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 16

Monomer mixture 1 is prepared by mixing 150 g of deionized water, 32.6 g of Surfactant A, 328 g of BA, 138.4 g of MMA, 262.4 g of AN. A second monomer emulsion is prepared from 320 g of deionized water, 94.8 g of Surfactant A, 601.5 g of BA, 377.3 g of MMA, 82 g of AAEM, and 32.8 g of MAA. A flask is charged with 1090 g of deionized water and 20 g of Surfactant B, and then brought to 80° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 45 minutes at 80° C. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 65 minutes. The temperature is allowed to rise to 85° C. over stage 2. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 17

Monomer mixture 1 is prepared by mixing 150 g of deionized water, 32.6 g of Surfactant A, 328 g of BA, 134.7 g of MMA, 262.4 g of AN, and 3.6 g of ALMA. A second monomer emulsion is prepared from 320 g of deionized water, 94.8 g of Surfactant A, 382.8 g of BA, 596 g of MMA, 82 g of AAEM, and 32.8 g of MAA. A flask is charged with 1090 g of deionized water and 20 g of Surfactant B, and then brought to 80° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 40 minutes at 80° C. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 65 minutes. The temperature is allowed to rise to 85° C. over stage 2. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 18

Monomer mixture 1 is prepared by mixing 150 g of deionized water, 32.6 g of Surfactant A, 328 g of BA, 134.7 g of MMA, 262.4 g of AN, and 3.6 g of ALMA. A second monomer emulsion is prepared from 320 g of deionized water, 94.8 g of Surfactant A, 492.1 g of BA, 486.6 g of MMA, 82 g of AAEM, and 32.8 g of MAA. A flask is charged with 1090 g of deionized water and 20 g of Surfactant B, and then brought to 80° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 40 minutes at 80° C. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 65 minutes. The temperature is allowed to rise ton 86° C. over stage 2. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 19

Monomer mixture 1 is prepared by mixing 150 g of deionized water, 32.6 g of Surfactant A, 287 g of BA, 92.5 g of MMA, 255.2 g of AN, and 3.2 g of ALMA. A second monomer emulsion is prepared from 320 g of deionized water, 94.8 g of Surfactant A, 651.6 g of BA, 415.8 g of MMA, 82 g of AAEM, and 35.5 g of MAA. A flask is charged with 1090 g of deionized water and 20 g of Surfactant B, and then brought to 80° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 35 minutes at 80° C. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 65 minutes. The temperature is allowed to rise to 85° C. over stage 2. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 20

Monomer mixture 1 is prepared by mixing 150 g of deionized water, 32.6 g of Surfactant A, 328 g of BA, 131.2 g of MMA, 262.4 g of AN, and 7.3 g of ALMA. A second monomer emulsion is prepared from 320 g of deionized water, 94.8 g of Surfactant A, 601.5 g of BA, 377.3 g of MMA, 82 g of AAEM, and 32.8 g of MAA. A flask is charged with 1090 g of deionized water and 20 g of Surfactant B, and then brought to 85° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 40 minutes at 85° C. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 65 minutes at 85° C. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 21

Monomer mixture 1 is prepared by mixing 150 g of deionized water, 32.6 g of Surfactant A, 328 g of 2-ethylhexyl acrylate, 134.7 g of MMA, 262.4 g of AN, and 3.6 g of ALMA. A second monomer emulsion is prepared from 320 g of deionized water, 94.8 g of Surfactant A, 601.5 g of BA, 377.3 g of MMA, 82 g of AAEM, and 32.8 g of MAA. A flask is charged with 1090 g of deionized water and 20 g of Surfactant B, and then brought to 85° C. under a nitrogen purge. The flask is then charged with a solution of 1.7 g of sodium persulfate in 20.3 g of deionized water and 102.6 g of monomer mixture 1. After 10 minutes, the remainder of monomer emulsion 1 is fed to the reactor over 45 minutes at 85° C. A mixture of 3.6 g of sodium persulfate in 120 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 65 minutes at 85° C. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 22

Monomer mixture 1 is prepared by mixing 150 g of deionized water, 32.6 g of Surfactant A, 287 g of BA, 54.2 g of MMA, 63.8 g of styrene, 229.6 g of AN, and 3.2 g of ALMA. A second monomer emulsion is prepared from 320 g of deionized water, 94.8 g of Surfactant A, 660 g of BA, 415.8 g of MMA, 82 g of AAEM, and 35.5 g of MAA. A flask is charged with 1140.7 g of deionized water and 9.1 g of Surfactant B, and then brought to 85° C. under a nitrogen purge. The flask is then charged with a solution of 3.6 g of sodium persulfate in 20.3 g of deionized water, 5.7 g of potassium bicarbonate in 50 g of deionized water, and 102.6 g of monomer mixture 1. After 10 minutes, the remainder of monomer emulsion 1 is fed to the reactor over 36 minutes at 85° C. A mixture of 1.7 g of sodium persulfate in 85 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 90 minutes at 85° C. At the completion of feeds, the reactor is allowed to stir for 15 minutes, then cooled. At 50° C., the latex is charged with 28% ammonium hydroxide solution to raise the pH to pH=9.0, sufficient water is added to dilute to ~45% solids, and then filtered to remove any coagulum.

Example 23

Monomer mixture 1 is prepared by mixing 110 g of deionized water, 26 g of Surfactant A, 218.7 g of BA, 128.5 g of MMA, 196.9 g of AN, and 2.7 g of ALMA. A second monomer emulsion is prepared from 380 g of deionized water, 103 g of Surfactant A, 702.1 g of BA, 445.5 g of MMA, 91 g of AAEM, and 38.3 g of MAA. A flask is charged with 1141 g of deionized water and 9.1 g of Surfactant A, and then brought to 85° C. under a nitrogen purge. The flask is then charged with a solution of 3.6 g of sodium persulfate in 20.3 g of deionized water and 102.6 g of monomer mixture 1. After 10 minutes, the remainder of monomer emulsion 1 is fed to the reactor over 35 minutes. A mixture of 1.6 g of sodium persulfate in 86.5 g of deionized water is simultaneously added to the reactor with monomer emulsions 1 and 2. At the completion of addition of monomer emulsion 1, the reaction is held at temperature for 15 minutes. Monomer emulsion 2 is then fed to the reactor over 95 minutes. At the completion of feeds, the reactor is allowed to stir, then cooled. At 65° C., a mixture of 25.5 g MMA and 10.9 g of divinylbenzene (80%) is added all at once to the kettle. A solution of 7.33 g of ferrous sulfate heptahydrate (1%) and 1.1 g of 1% ethylenediamine tetracetic acid, sodium salt is added to the reactor. A solution of 1 g of t-butylhydroperoxide (70%) in 11.2 g of water is added in followed by a solution of 0.7 g erythorbic acid in 16.8 g of water. The reaction is allowed to stir for 10 minutes, and then cooled. At 50° C. the latex is charged with 28% ammonium hydroxide solution to raise the pH to pH=9.0, sufficient water is added to dilute to ~45% solids, and then filtered to remove any coagulum.

Preparation of Coating Compositions

Coating compositions are prepared using a pre-dispersed titanium dioxide slurry by combining the ingredients in Table 1.

TABLE 1

Ingredients for Coating Compositions

| Ingredient | Amount | Source |
| --- | --- | --- |
| Water | 417.9 g | |
| Polymer composition of Example 1 | 274.4 g | |
| Tamol ™ 2001 dispersant | 11.4 g | Rohm and Haas Company |
| Ammonium hydroxide | 0.25 g | Fisher Scientific |
| Ti-Pure ™ R-746 titanium dioxide slurry | 302.0 g | E. I. DuPont de Nemours and Co. |
| Texanol ™ coalescent | 5.49 g | Eastman Chemical Co. |
| Fungitrol ® 720 Fungicide | 8.0 | International Specialty Products |
| Propylene glycol | 9.32 | DOW Union Carbide Corporation |
| Triton ™ X-405 Surfactant | 2.3 g | DOW Union Carbide Corporation |
| BYK-024 water defoamer | 2.0 | BYK-Chemie USA |
| Acrysol ™ RM-5000 rheology modifier | 18.5 g | Rohm and Haas Company |
| Acrysol ™ RM-8W rheology modifier | 2.0 g* | Rohm and Haas Company |

*Note:
the level of Acrysol ™ RM-8W rheology modifier can be adjusted to meet a target viscosity of 90 KU.

Coating compositions, Paints 1-23, are prepared according to the above procedure by replacing the polymer composition of Example 1 with an equivalent quantity (based on solids) of the polymer composition of Examples 1-23. Comparative coating compositions, Paints Comparative 1A through Comparative 7A, are also prepared according to the above procedure by replacing the polymer composition of Example 1 with an equivalent quantity (based on solids) of the respective comparative polymer composition.

Preparation and Evaluation of Coated Substrates—Low Temperature Film Formation (LTFF):

The substrate, coating composition, and other test materials are equilibrated prior to coating for at least one hour at the test conditions of 4.4° C. (40° F.) and 40% relative humidity. The coating composition is applied using a 2-path "Straddle" wet film applicator, using the side having 10 mil path depth, onto a Leneta, Form 1B, Penopac chart. The applied coating composition is allowed to dry at the test conditions for 16 hours. The low temperature film formation is then evaluated by examining the dried coating composition for cracking.

The degree of cracking is characterized using a 10× magnifying glass according to the following rating scale. Coatings with ratings of 8 and greater are considered to have acceptable low temperature film formation.

10=none
9=trace
8=trace/slight
7=slight
6=slight/moderate
5=moderate
4=moderate/heavy
3=heavy
2=heavy/very heavy
1=very heavy Preparation and Evaluation of Coated Substrates—Film Dirt Pick-up Resistance (DPUR):

The coating composition is applied to an alcohol cleaned, mill finished, aluminum Q-panel with an 8-path wet film applicator, using the side having 7 mil path depth. The coating is allowed to dry at 25° C. (77° F.) for 7 days. A slurry of brown iron oxide is then coated on each panel by brush, attempting to maintain a uniform rate of application. The slurry is allowed to dry on the panel for 16 hrs before gently scrubbing with cheesecloth under cool tap water until it is apparent that no more slurry can be removed easily by this procedure (~15 sec). After completion of this washing procedure, the panels are left to dry for at least one hour. Dirt pick up resistance is evaluated by measuring the delta E relative to an unblemished coating using a HunterLab Miniscan XE Plus colorimeter (specular excluded 45/0). Lower numerical values indicate less change in color and thus better dirt pick up resistance. A delta E value of 15 or less is considered an acceptable level of resistance to dirt pick up (DPU).

The dirt pick up resistance for oil exposed coatings, DPUR Oil, is another industry measure that takes into account that some coatings are particularly prone to discoloration after exposure to oily substances. This test is conducted as above with the following modification: after coating the panels and allowing to dry for 7 days (as above), a layer of Lubriderm™ hand lotion is brushed on (thick) and left for 16 hours, after which time the lotion is wiped off and buffed clean with a dry cloth (no application of water). The brown iron oxide slurry is then immediately applied and the test procedure followed as above.

In the case of DPU Oil, a delta E of 20 or less represents an acceptable level of resistance.

The results show that the coating compositions prepared from the polymer composition of this invention, in most cases, demonstrate an advantage for either low temperature film formation or dirt pick-up resistance. Several of the examples demonstrate an advantage for both properties. In contrast, coatings prepared using polymer compositions of the Comparative Examples generally had poorer low temperature film formation and/or dirt pick up resistance. Improving both properties simultaneously is of great importance while developing coatings compositions to meet the needs of low cosolvent demand while maintaining the film hardness as measured by resistance to dirt pick-up.

We claim:

1. A polymer composition comprising polymer particles dispersed in an aqueous medium, wherein the polymer particles comprise, based on the weight of the polymer particles:
   (a) from 20 to 70 weight. % of a first polymer wherein the first polymer has a Tg from −30° C. to 100° C. and comprises as polymerized units, based on the weight of the first polymer
      i) 15 to 50 weight % of one or more of the following monomers: acrylonitrile, methacrylonitrile, vinylbenzonitrile and its isomers, cyanoacrylates, alpha-cyano styrene and cyanated styrenics, and
      ii) 50 to 85 weight % of one or more ethylenically unsaturated comonomers, and

TABLE 2

Low Temperature Film Formation and Dirt Pick Up Resistance for Coating Compositions

| Example number | Paint number | % Texanol | LTFF | DPU | DPU Oil | Particle Size (nm) | Tg (K) Stage 1 | Tg (K) Stage 2 |
|---|---|---|---|---|---|---|---|---|
| 1 | 1A | 2 | 10 | 27 | 27 | 111 | 291 | 267 |
| Comp 1 | Comp 1A | 2 | 7 | 29 | 29 | 123 | 293 | 267 |
| 2 | 2A | 2 | 8 | 10 | 16 | 112 | 283 | 267 |
| Comp 2 | Comp 2A | 2 | 5 | 20 | 23 | 126 | 285 | 266 |
| 3 | 3A | 2 | 4 | 8 | 12 | 109 | 283 | 269 |
| 3 | 3B | 6 | 10 | 4 | 8 | 109 | 283 | 269 |
| Comp 3 | Comp 3B | 6 | 10 | 14 | 20 | 120 | 289 | 268 |
| 4 | 4A | 2 | 10 | 26 | 31 | 108 | 283 | 267 |
| Comp 4 | Comp 4A | 2 | 10 | 32 | 29 | 116 | 285 | 267 |
| 5 | 5A | 2 | 9 | 19 | 25 | 108 | 283 | 267 |
| Comp 5 | Comp 5A | 2 | 4 | 32 | 33 | 112 | 285 | 266 |
| 6 | 6A | 2 | 9 | 24 | 28 | 108 | 283 | 270 |
| Comp 6 | Comp 6A | 2 | 4 | 32 | 33 | 114 | 285 | 270 |
| 7 | 7A | 4 | 7 | 3 | 5 | 118 | 283 | 267 |
| Comp 7 | Comp 7A | 4 | 7 | 6 | 11 | 117 | 285 | 267 |
| 8 | 8A | 2 | 3 | 10 | 24 | 110 | 284 | 272 |
| 9 | 9A | 2 | 8 | 7 | 21 | 108 | 276 | 272 |
| 9 | 9B | 4 | 8 | 8 | 12 | 108 | 276 | 272 |
| 10 | 10A | 2 | 5 | 6 | 16 | 109 | 283 | 272 |
| 10 | 10B | 4 | 8 | 4 | 10 | 109 | 283 | 272 |
| 11 | 11A | 2 | 7 | 9 | 15 | 126 | 268 | 266 |
| 12 | 12A | 2 | 8 | 12 | 17 | 126 | 268 | 263 |
| 13 | 13A | 2 | 8 | 6 | 10 | 125 | 268 | 261 |
| 14 | 14A | 2 | 8 | 7 | 12 | 116 | 283 | 264 |
| 15 | 15A | 2 | 7 | 7 | 11 | 110 | 283 | 267 |
| 16 | 16A | 2 | 8 | 7 | 15 | 116 | 283 | 267 |
| 17 | 17A | 12 | 1 | 1 | 1 | 108 | 283 | 296 |
| 18 | 18A | 8 | 8 | 2 | 5 | 108 | 283 | 281 |
| 19 | 19A | 2 | 9 | 14 | 19 | 105 | 283 | 267 |
| 20 | 20A | 2 | 8 | 12 | 25 | 101 | 283 | 267 |
| 21 | 21A | 2 | 8 | 12 | 20 | 100 | 258 | 267 |
| 22 | 22A | 2 | 7 | 8 | 13 | 109 | 283 | 267 |
| 23 | 23A | 2 | 8 | 6 | 11 | 110 | 283 | 266 |
| 23 | 23B | 4 | 8 | 14 | 14 | | | |

(b) 30 to 80 weight % of a second polymer wherein the second polymer has a Tg from −10° C. to 18° C. and comprises as polymerized units, based on the weight of the second polymer:
  i) 70 to 98.5 weight % of one or more ethylenically unsaturated comonomers,
  ii) 0.5 to 10 weight % of one or more acid functional or anionic monomers, and
  iii) 1 to 20 weight % of one or more monomers selected from the group consisting of acetoacetoxyethyl (meth)acrylate, acetoacetoxypropyl(meth)acrylate, acetoacetoxybutyl(meth)acrylate, 2,3-di(acetoacetoxy)propyl(meth)acrylate, allyl acetoacetate, and vinyl acetoacetate; acetoacetamidoethyl(meth)acrylate, acetoacetamidopropyl(meth)acrylate, acetoacetamidobutyl(meth)acrylate, 2,3-di(acetoacetamido)propyl(meth)acrylate, allyl acetoacetamide, and vinyl acetoacetamide; cyanoacetoxyethyl(meth)acrylate, cyanoacetoxypropyl(meth)acrylate, cyanoacetoxybutyl(meth)acrylate, 2,3-di(cyanoacetoxy)propyl(meth)acrylate, allyl cyanoacetate, and vinyl cyanoacetate; cyanoacetamidoethyl(meth)acrylate, cyanoacetamidopropyl(meth)acrylate; cyanoacetamidobutyl(meth)acrylate, 2,3-di(cyanoacetamido)propyl(meth)acrylate, allyl cyanoacetamide, and vinyl cyanoacetamide.

2. The polymer composition of claim 1 wherein the first polymer further comprises 0.1 to 10 weight %, based on the weight of the first polymer, of one or more multiethylenically unsaturated monomers.

3. The polymer composition of claim 1 wherein (a) the first polymer further comprises 0.5 to 5 weight % of one or more acid functional or anionic monomers, or polymerizable stabilizing reagents; or (b) the polymer composition comprises a stabilizing reagent.

4. The polymer composition of claim 2 wherein (a) the first polymer further comprises 0.5 to 5 weight % of one or more acid functional or anionic monomers, or polymerizable stabilizing reagents; or (b) the polymer composition comprises a stabilizing reagent.

5. The polymer composition according to claim 1, wherein (a) the second polymer further comprises 0.5 to 10 weight %, based on the weight of the second polymer, of one or more acid functional or anionic monomers, or polymerizable stabilizing reagents; or (b) the polymer composition comprises a stabilizing reagent.

6. The polymer composition according to claim 2, wherein (a) the second polymer further comprises 0.5 to 10 weight %, based on the weight of the second polymer, of one or more acid functional or anionic monomers, or polymerizable stabilizing reagents; or (b) the polymer composition comprises a stabilizing reagent.

7. The polymer composition according to claim 1 wherein the second polymer has a Tg in the range of −10° C. to 5° C.

8. The polymer composition according to claim 1 whose minimum film formation temperature is no greater than 30° C.

9. A coating composition comprising a polymer composition according to claim 1 wherein the coating composition comprises one or more pigments wherein the coating composition has a pigment volume concentration from 1 to 45%.

10. The coating composition according to claim 9 comprising from 0.01 to less than 6 weight % volatile organic compounds, based on the weight of the dry polymer composition.

11. The coating composition according to claim 9 wherein the second polymer has a Tg in the range of −10° C. to 15° C.

12. The coating composition according to claim 9 whose minimum film formation temperature is no greater than 30° C.

* * * * *